(12) United States Patent
Van Dyke et al.

(10) Patent No.: US 6,904,486 B2
(45) Date of Patent: Jun. 7, 2005

(54) 32 BIT GENERIC BUS INTERFACE USING READ/WRITE BYTE ENABLES

(75) Inventors: Phil Van Dyke, Surrey (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 10/155,092

(22) Filed: May 23, 2002

(65) Prior Publication Data

US 2003/0221028 A1 Nov. 27, 2003

(51) Int. Cl.⁷ ............................................. G06F 13/00
(52) U.S. Cl. ...................................... 710/305; 710/306
(58) Field of Search ........................... 710/62–64, 72, 710/305, 306, 311, 313, 315; 345/204, 520, 530, 531

(56) References Cited

U.S. PATENT DOCUMENTS

| | | | |
|---|---|---|---|
| 4,766,538 A | 8/1988 | Miyoshi | |
| 5,339,395 A | 8/1994 | Pickett et al. | |
| 5,732,250 A | 3/1998 | Bates et al. | |
| 5,812,798 A | 9/1998 | Moyer et al. | |
| 5,854,944 A | 12/1998 | Catherwood et al. | |
| 5,890,196 A | 3/1999 | Miller et al. | |
| 5,917,467 A | * 6/1999 | Yoshimura | 345/581 |
| 5,968,164 A | 10/1999 | Loen et al. | |
| 6,003,120 A | 12/1999 | Hardin | |
| 6,049,844 A | 4/2000 | Matsui et al. | |
| 6,122,690 A | 9/2000 | Nannetti et al. | |
| 6,567,880 B1 | * 5/2003 | Olarig | 710/306 |
| 6,750,870 B2 | * 6/2004 | Olarig | 345/531 |

* cited by examiner

*Primary Examiner*—Khanh Dang (57) ABSTRACT

A display controller configured to communicate with a microprocessor is provided. The display controller includes a memory core for storing image data to be displayed and a register set containing configuration data enabling presentation of the image data. A bus interface enabling communication over a bus between the memory core of the display controller and the microprocessor is included. The bus interface is configured to communicate with a set of command signals. The set of command signals defines both whether read operations and write operations are to occur over a bus cycle and whether valid data exists for each bit of the read operation and the write operation. Each command signal in the set of command signals defines enable data for the read operations or write operations. A system including the display controller and methods for adapting the display controller to communicate with a variety of microprocessors are also included.

29 Claims, 11 Drawing Sheets

| CS# | WE3# | WE2# | WE1# | WE0# | RD3# | RD2# | RD1# | RD0# | Data Bus Selected | Bus Cycle |
|---|---|---|---|---|---|---|---|---|---|---|
| 1 | X | X | X | X | X | X | X | X | N/A | Not Valid |
| 0 | 1 | 1 | 1 | 1 | 1 | 1 | 1 | 1 | N/A | Not Valid |
| 0 | 1 | 1 | 1 | 1 | 1 | 1 | 1 | 0 | D[7:0] | low even 8-bit read |
| 0 | 1 | 1 | 1 | 1 | 1 | 1 | 0 | 1 | D[15:7] | low odd 8-bit read |
| 0 | 1 | 1 | 1 | 1 | 1 | 1 | 0 | 0 | D[15:0] | low 16-bit read |
| 0 | 1 | 1 | 1 | 1 | 1 | 0 | 1 | 1 | D[23:15] | high even 8-bit read |
| 0 | 1 | 1 | 1 | 1 | 1 | 0 | 1 | 0 | N/A | Not Valid |
| 0 | 1 | 1 | 1 | 1 | 1 | 0 | 0 | 1 | N/A | Not Valid |
| 0 | 1 | 1 | 1 | 1 | 1 | 0 | 0 | 0 | N/A | Not Valid |
| 0 | 1 | 1 | 1 | 1 | 0 | 1 | 1 | 1 | D[31:24] | high odd 8-bit read |
| 0 | 1 | 1 | 1 | 1 | 0 | 1 | 1 | 0 | N/A | Not Valid |
| 0 | 1 | 1 | 1 | 1 | 0 | 1 | 0 | 1 | N/A | Not Valid |
| 0 | 1 | 1 | 1 | 1 | 0 | 1 | 0 | 0 | N/A | Not Valid |
| 0 | 1 | 1 | 1 | 1 | 0 | 0 | 1 | 1 | D[31:24] | high 16-bit read |
| 0 | 1 | 1 | 1 | 1 | 0 | 0 | 1 | 0 | N/A | Not Valid |
| 0 | 1 | 1 | 1 | 1 | 0 | 0 | 0 | 1 | N/A | Not Valid |
| 0 | 1 | 1 | 1 | 1 | 0 | 0 | 0 | 0 | D[31:0] | 32-bit read |
| 0 | 1 | 1 | 1 | 0 | 1 | 1 | 1 | 1 | D[7:0] | low even 8-bit write |
| 0 | 1 | 1 | 0 | 1 | 1 | 1 | 1 | 1 | D[15:7] | low odd 8-bit write |
| 0 | 1 | 1 | 0 | 0 | 1 | 1 | 1 | 1 | D[15:0] | low 16-bit write |
| 0 | 1 | 0 | 1 | 1 | 1 | 1 | 1 | 1 | D[23:15] | high even 8-bit write |
| 0 | 1 | 0 | 1 | 0 | 1 | 1 | 1 | 1 | N/A | Not Valid |
| 0 | 1 | 0 | 0 | 1 | 1 | 1 | 1 | 1 | N/A | Not Valid |
| 0 | 1 | 0 | 0 | 0 | 1 | 1 | 1 | 1 | N/A | Not Valid |
| 0 | 0 | 1 | 1 | 1 | 1 | 1 | 1 | 1 | D[31:24] | high odd 8-bit write |
| 0 | 0 | 1 | 1 | 0 | 1 | 1 | 1 | 1 | N/A | Not Valid |
| 0 | 0 | 1 | 0 | 1 | 1 | 1 | 1 | 1 | N/A | Not Valid |
| 0 | 0 | 1 | 0 | 0 | 1 | 1 | 1 | 1 | N/A | Not Valid |
| 0 | 0 | 0 | 1 | 1 | 1 | 1 | 1 | 1 | D[31:24] | high 16-bit write |
| 0 | 0 | 0 | 1 | 0 | 1 | 1 | 1 | 1 | N/A | Not Valid |
| 0 | 0 | 0 | 0 | 1 | 1 | 1 | 1 | 1 | N/A | Not Valid |
| 0 | 0 | 0 | 0 | 0 | 1 | 1 | 1 | 1 | D[31:0] | 32-bit write |

| Symbol | Parameter |
|---|---|
| fCLK | Bus clock frequency |
| TCLK | Bus clock period |
| t1 | A[20:1], M/R# setup to first CLK rising edge where CS# = 0 and either RD0#, RD1#, RD2#, RD3# = 0 or WE0#, WE1#, WE2#, WE3# = 0 |
| t2 | CS# setup to CLK rising edge |
| t3 | RD0#, RD1#, RD2#, RD3#, WE0#, WE1#, WE2#, WE3# setup to CLK rising edge |
| t4 | RD0#, RD1#, RD2#, RD3#, WE0#, WE1#, WE2#, WE3# state change to WAIT# driven low |
| t5 | RD0#, RD1#, RD2#, RD3# falling edge to D[15:0] driven (read cycle) |
| t6 | D[15:0] setup to 4th rising CLK edge after CS# = 0 and WE0#, WE1#, WE2#, WE3# = 0 |
| t7 | A[20:1], M/R# and CS# hold from RD0#, RD1#, RD2#, RD3#, WE0#, WE1#, WE2#, WE3# rising edge |
| t8 | CS# deasserted to reasserted |
| t9 | WAIT# rising edge to RD0#, RD1#, RD2#, RD3#, WE0#, WE1#, WE2#, WE3# rising edge |
| t10 | RD0#, RD1#, RD2#, RD3#, WE0#, WE1#, WE2#, WE3# deasserted to reasserted |
| t11 | Rising edge of either RD0#, RD1#, RD2#, RD3#, WE0#, WE1#, WE2#, WE3# to WAIT# high impedance |
| t12 | D[31:0] hold from WE0#, WE1#, WE2#, WE3# rising edge (write cycle) |
| t13 | D[31:0] hold from RD0#, RD1#, RD2#, RD3# rising edge (read cycle) |
| t14 | Cycle Length |
| t15 | CLK rising edge to WAIT# rising edge |
| t16 | Read data setup |

FIG._5

| CS# | MEMR# | MEMW# | BE3# | BE2# | BE1# | BE0# | Data Bus Selected | Bus Cycle |
|---|---|---|---|---|---|---|---|---|
| 1 | X | X | X | X | X | X | N/A | Not Valid |
| 0 | 0 | 1 | 1 | 1 | 1 | 1 | N/A | Not Valid |
| 0 | 0 | 1 | 1 | 1 | 1 | 0 | D[7:0] | low even 8-bit read |
| 0 | 0 | 1 | 1 | 1 | 0 | 1 | D[15:7] | low odd 8-bit read |
| 0 | 0 | 1 | 1 | 1 | 0 | 0 | D[15:0] | low 16-bit read |
| 0 | 0 | 1 | 1 | 0 | 1 | 1 | D[23:15] | high even 8-bit read |
| 0 | 0 | 1 | 1 | 0 | 1 | 0 | N/A | Not Valid |
| 0 | 0 | 1 | 1 | 0 | 0 | 1 | N/A | Not Valid |
| 0 | 0 | 1 | 1 | 0 | 0 | 0 | N/A | Not Valid |
| 0 | 0 | 1 | 0 | 1 | 1 | 1 | D[31:24] | high odd 8-bit read |
| 0 | 0 | 1 | 0 | 1 | 1 | 0 | N/A | Not Valid |
| 0 | 0 | 1 | 0 | 1 | 0 | 1 | N/A | Not Valid |
| 0 | 0 | 1 | 0 | 1 | 0 | 0 | N/A | Not Valid |
| 0 | 0 | 1 | 0 | 0 | 1 | 1 | D[31:24] | high 16-bit read |
| 0 | 0 | 1 | 0 | 0 | 1 | 0 | N/A | Not Valid |
| 0 | 0 | 1 | 0 | 0 | 0 | 1 | N/A | Not Valid |
| 0 | 0 | 1 | 0 | 0 | 0 | 0 | D[31:0] | 32-bit read |
| 0 | 1 | 0 | 1 | 1 | 1 | 1 | N/A | Not Valid |
| 0 | 1 | 0 | 1 | 1 | 1 | 0 | D[7:0] | low even 8-bit write |
| 0 | 1 | 0 | 1 | 1 | 0 | 1 | D[15:7] | low odd 8-bit write |
| 0 | 1 | 0 | 1 | 1 | 0 | 0 | D[15:0] | low 16-bit write |
| 0 | 1 | 0 | 1 | 0 | 1 | 1 | D[23:15] | high even 8-bit write |
| 0 | 1 | 0 | 1 | 0 | 1 | 0 | N/A | Not Valid |
| 0 | 1 | 0 | 1 | 0 | 0 | 1 | N/A | Not Valid |
| 0 | 1 | 0 | 1 | 0 | 0 | 0 | N/A | Not Valid |
| 0 | 1 | 0 | 0 | 1 | 1 | 1 | D[31:24] | high odd 8-bit write |
| 0 | 1 | 0 | 0 | 1 | 1 | 0 | N/A | Not Valid |
| 0 | 1 | 0 | 0 | 1 | 0 | 1 | N/A | Not Valid |
| 0 | 1 | 0 | 0 | 1 | 0 | 0 | N/A | Not Valid |
| 0 | 1 | 0 | 0 | 0 | 1 | 1 | D[31:24] | high 16-bit write |
| 0 | 1 | 0 | 0 | 0 | 1 | 0 | N/A | Not Valid |
| 0 | 1 | 0 | 0 | 0 | 0 | 1 | N/A | Not Valid |
| 0 | 1 | 0 | 0 | 0 | 0 | 0 | D[31:0] | 32-bit write |

| Symbol | Parameter |
|---|---|
| fCLK | Bus clock frequency |
| TCLK | Bus clock period |
| t1 | A[20:1], M/R#, BE3#, BE2#, BE1#, BE0# setup to first CLK rising edge where CS# = 0 and either MEMR# = 0 or MEMW# = 0 |
| t2 | CS# setup to CLK rising edge |
| t3 | MEMR#, MEMW# setup to CLK rising edge |
| t4 | MEMR#, MEMW# state change to IOCHRDY# driven low |
| t5 | MEMR# falling edge to D[15:0] driven (read cycle) |
| t6 | D[15:0] setup to 4th rising CLK edge after CS# = 0 and WE0#, WE1#, WE2#, WE3# = 0 |
| t7 | A[20:1], M/R#, BE[3:0]# and CS# hold from MEMR#, MEMW# rising edge |
| t8 | CS# deasserted to reasserted |
| t9 | WAIT# rising edge to MEMR# MEMW# rising edge |
| t10 | MEMR#, MEMW# deasserted to reasserted |
| t11 | Rising edge of either MEMR#, MEMW# to IOCHRDY# high impedance |
| t12 | D[31:0] hold from MEMW# rising edge (write cycle) |
| t13 | D[31:0] hold from MEMR# rising edge (read cycle) |
| t14 | Cycle Length |
| t15 | CLK rising edge to IOCHRDY# rising edge |
| t16 | Read data setup |

FIG._8

| CS# | R/W# | ByteSel3# | ByteSel2# | ByteSel1# | ByteSel0# | Data Bus Selected | Bus Cycle |
|---|---|---|---|---|---|---|---|
| 1 | X | X | X | X | X | N/A | Not Valid |
| 0 | 1 | 1 | 1 | 1 | 1 | N/A | Not Valid |
| 0 | 1 | 1 | 1 | 1 | 0 | D[7:0] | low even 8-bit read |
| 0 | 1 | 1 | 1 | 0 | 1 | D[15:7] | low odd 8-bit read |
| 0 | 1 | 1 | 1 | 0 | 0 | D[15:0] | low 16-bit read |
| 0 | 1 | 1 | 0 | 1 | 1 | D[23:15] | high even 8-bit read |
| 0 | 1 | 1 | 0 | 1 | 0 | N/A | Not Valid |
| 0 | 1 | 1 | 0 | 0 | 1 | N/A | Not Valid |
| 0 | 1 | 1 | 0 | 0 | 0 | N/A | Not Valid |
| 0 | 1 | 0 | 1 | 1 | 1 | D[31:24] | high odd 8-bit read |
| 0 | 1 | 0 | 1 | 1 | 0 | N/A | Not Valid |
| 0 | 1 | 0 | 1 | 0 | 1 | N/A | Not Valid |
| 0 | 1 | 0 | 1 | 0 | 0 | N/A | Not Valid |
| 0 | 1 | 0 | 0 | 1 | 1 | D[31:24] | high 16-bit read |
| 0 | 1 | 0 | 0 | 1 | 0 | N/A | Not Valid |
| 0 | 1 | 0 | 0 | 0 | 1 | N/A | Not Valid |
| 0 | 1 | 0 | 0 | 0 | 0 | D[31:0] | 32-bit read |
| 0 | 0 | 1 | 1 | 1 | 1 | N/A | Not Valid |
| 0 | 0 | 1 | 1 | 1 | 0 | D[7:0] | low even 8-bit write |
| 0 | 0 | 1 | 1 | 0 | 1 | D[15:7] | low odd 8-bit write |
| 0 | 0 | 1 | 1 | 0 | 0 | D[15:0] | low 16-bit write |
| 0 | 0 | 1 | 0 | 1 | 1 | D[23:15] | high even 8-bit write |
| 0 | 0 | 1 | 0 | 1 | 0 | N/A | Not Valid |
| 0 | 0 | 1 | 0 | 0 | 1 | N/A | Not Valid |
| 0 | 0 | 1 | 0 | 0 | 0 | N/A | Not Valid |
| 0 | 0 | 0 | 1 | 1 | 1 | D[31:24] | high odd 8-bit write |
| 0 | 0 | 0 | 1 | 1 | 0 | N/A | Not Valid |
| 0 | 0 | 0 | 1 | 0 | 1 | N/A | Not Valid |
| 0 | 0 | 0 | 1 | 0 | 0 | N/A | Not Valid |
| 0 | 0 | 0 | 0 | 1 | 1 | D[31:24] | high 16-bit write |
| 0 | 0 | 0 | 0 | 1 | 0 | N/A | Not Valid |
| 0 | 0 | 0 | 0 | 0 | 1 | N/A | Not Valid |
| 0 | 0 | 0 | 0 | 0 | 0 | D[31:0] | 32-bit write |

| Symbol | Parameter |
|---|---|
| t1 | A[20:1], M/R#, setup to CS# = 0 |
| t2 | BYTESEL [3:0], R/W#, setup to CS# = 0 |
| t3 | CS driven low to WAIT driven low |
| t4 | CS# falling edge to D[31:0] driven (write cycle) |
| t5 | CS# falling edge to D[31:0] driven (read cycle) |
| t6 | A[20:1], M/R# and CS# hold from BYTESEL, R/W# rising edge |
| t7 | D[31:0] hold from CS# rising edge (write cycle/read cycle) |
| t8 | D[31:0] setup from CS# rising edge (read cycle) |
| t9 | D[31:0] hold from CS# rising edge (read cycle) |

# 32 BIT GENERIC BUS INTERFACE USING READ/WRITE BYTE ENABLES

BACKGROUND OF THE INVENTION

1. Field of the Invention

This invention relates generally to computer systems and more particularly to a generic bus interface capable of communicating with a variety of microprocessors.

2. Description of the Related Art

Portable consumer electronic devices are pervasive in all aspects of society today. Examples of such devices include personal digital assistants (PDA), mobile phones, pagers, web tablets, etc. These portable devices contain embedded systems that include central processing units (CPU). Due to the narrow range of functions provided by these handheld devices, the CPUs associated with these embedded systems are not required to have as powerful computing power as desktop or laptop CPUs. A number of vendors provide CPUs designed specifically for a type of handheld device. As is well known, the CPUs also include native buses that support the CPUs. Additionally, the devices include a display screen where images are presented under the control of a display controller, such as a liquid crystal display (LCD) controller. The display controller, typically manufactured by a vendor different from the CPU vendor, is customized to include a bus interface that allows the display controller to communicate with specific CPUs through a system bus. Because of the wide variety of the CPUs, the display controllers tend to be customized to interface with a narrow range of CPUs.

Figure 1:
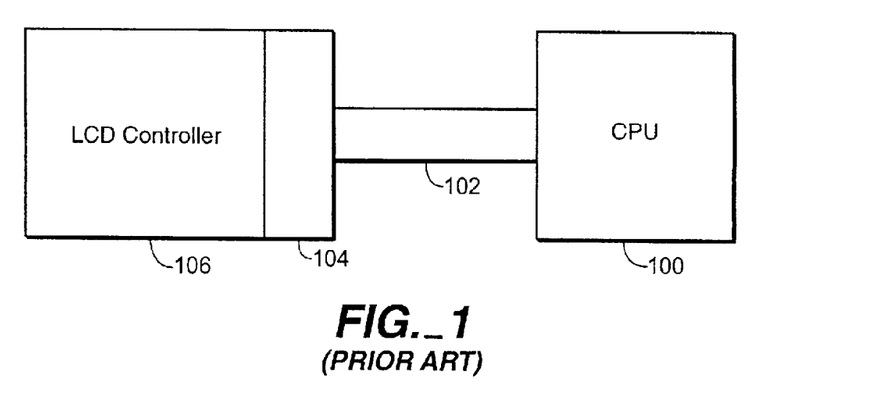
FIG. 1 is a schematic diagram of an embedded system including a CPU in communication with a display controller, such as a LCD controller.

FIG. 1 is a schematic diagram of an embedded system including a CPU in communication with a LCD controller. CPU 100 communicates through bus 102 to bus interface 104 of LCD controller 106. The brand of CPU 100 and type of bus 102 dictates the requirements for the bus interface 104 of LCD controller 106. Thus, bus interface 104 of LCD controller 106 is customized for the different types of buses and CPUs on the market. The customization requires LCD controllers with different bus interfaces for each of the different types of buses and CPUs.

Since there are a large variety of CPUs supplied from vendors such as Motorola, Hitachi, Intel, etc. for the portable devices, customization of the display controller's bus interface becomes an expensive proposition to support each of the available microprocessors and their native bus interfaces. That is, different bus interfaces for each CPU must be supported by the supplier of the LCD controller. Since each of the native bus interfaces will have different pins as well as different signals to be accommodated, the management of which interface is associated with which CPU becomes a difficult task. Accordingly, the LCD chip is more complex and less flexible through the customization required by this approach.

The portable consumer electronic devices incorporating the LCD controller are designed to consume low amounts of power since the devices are typically battery powered. In addition, size is constantly being reduced as the devices are designed with portability in mind. Thus, it is not practical to simply combine the different bus interfaces with one LCD controller because of the multitude of interfaces available. That is, if all the bus interfaces were simply added to the LCD controller, the LCD would have a huge pin count for accommodating a large number of signals. As a result, the size of the LCD controller would be prohibitive and the power consumption would increase if each bus interface was simply added to the LCD controller.

As a result, there is a need to solve the problems of the prior art to provide an LCD controller with a generic bus interface having the flexibility of communicating with a variety of microprocessors without complicating the chip architecture or increasing the size of the controller.

SUMMARY OF THE INVENTION

Broadly speaking, the present invention fills these needs by providing a generic bus interface configured to be compatible with a variety of microprocessors and their native buses. It should be appreciated that the present invention can be implemented in numerous ways, including as a process, a system, or a device. Several inventive embodiments of the present invention are described below.

In one embodiment a display controller configured to communicate with a microprocessor is provided. The display controller includes a memory core for storing image data to be displayed and a register set containing configuration data enabling presentation of the image data. A bus interface enabling communication over a bus between the memory core of the display controller and the microprocessor is included. The bus interface is configured to communicate with a set of command signals. The set of command signals defines both whether read operations and write operations are to occur over a bus cycle and whether valid data exists for each bit of the read operation and the write operation. Each command signal in the set of command signals defines enable data for the read operations or write operations.

In another embodiment, a system having a display controller with a generic bus interface is provided. The system includes a central processing unit (CPU) and a data bus. A display controller in communication with the CPU through the data bus is included. The display controller includes a bus interface enabling communication over the data bus with the CPU. The bus interface is configured to communicate with a set of command signals. The set of command signals defines both whether read operations and write operations are to occur over a bus cycle and whether valid data exists for each bit of the read operation and the write operation. Each command signal in the set of command signals defines enable data for the read operations or the write operations.

In yet another embodiment, a method for performing a read operation or a write operation between a microprocessor and a display controller is provided. The method initiates with a set of command signals being defined. The set of command signals is configured to indicate whether the read operation or the write operation is to be performed over a bus cycle and whether valid data exists for each bit of the read operation and the write operation. Each command signal in the set of command signals defines enable data for one of the read operations and write operations. Then, a display controller in communication with a system bus is selected. Next, the set of command signals are asserted. Then, the asserted set of command signals are sampled to determine a type of operation and a bit-location of valid data on the system bus. Next, the bit location of the system bus having the valid data is selected. Then, the read operation or write operation is performed.

In still yet another embodiment, a method for adapting a display controller to communicate with a variety of microprocessors is provided. The method initiates with a chip select signal being received. Then, the chip select signal is acknowledged. Next, a set of command signals is received. The set of command signals is configured to indicate whether the read operation or the write operation is to be performed over a bus cycle and whether valid data exists for each bit of the read operation and the write operation. Each command signal in the set of command signals defines enable data for the read operations or write operations. Then, the read or the write operation is performed for the valid data as defined by the command signals.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for providing a generic bus interface for a controller that is adapted to communicate with a variety of central processing units (CPU). It should be appreciated that the various signals processed through the bus interface are referred to herein as an abbreviation for the signal followed by the "#" symbol. Of course, other common designations in the art for signals include an abbreviation with an over line or an abbreviation followed by the letter "X". Additionally, logic high values may be referred to as having a binary value of "1" while a logic low value may be referred to as having a binary value of "0." It will be apparent, however, to one skilled in the art, in view of the following description, that the present invention may be practiced without some or all of these specific details. In other instances, well known process operations have not been described in detail in order not to unnecessarily obscure the present invention.

The embodiments of the present invention provide a generic bus interface for a display controller in communication with a CPU. In one embodiment, the configuration of the command signals provided to the generic bus interface enables communication with a variety of microprocessors and their associated native buses. As will be explained in more detail below, the command signals are configured to define a read or write operation to be performed as well as defining a location of valid data on the native bus. In another embodiment, the generic bus interface accommodates an asynchronous exchange of data. Here, the display controller and the CPU are controlled by different clocks having different clock speeds. Through the handshaking defined between the CPU and the display controller, previous limitations required due to differences in operating speeds between the clock speeds, no longer apply.

The generic bus interface described herein, is capable of communicating with a variety of CPUs, particularly the CPUs in the embedded market, which include processors from HITACHI, MOTOROLA, INTEL, etc. As is well known, embedded systems define microprocessor based electronic systems that perform an application-specific set of functions. Embedded systems tend to be dedicated to sensing and responding to input. One skilled in the art will appreciate that the embedded systems exist in many industries, including automotive, communications, consumer and industrial. More specifically, embedded systems are used with compact portable handheld devices, such as personal digital assistants (PDA), mobile phones, pagers, web tablets, etc. These portable handheld devices do not require the same amount of computing power as a desktop or laptop computer because of their specific nature. Additionally, these devices consume less power than the desktop or laptop systems because of battery power limitations. Accordingly, devices incorporating embedded systems do not provide the same degree of functionality as desktop computer systems. While the embodiments described below are directed toward CPUs for handheld electronic devices, these embodiments are exemplary and not meant to be limiting. It will be apparent to one skilled in the art that the generic bus interface can be configured to communicate with CPUs for desktop and portable personal computers.

In one embodiment, the generic bus interface supports a data width of 32 bits addressable over 21 bits of address space. Of course, the bus interface can support a data width over any suitable number of bits of address space. The bus interface is configured to accommodate the signals that are necessary to attach to most CPU interfaces through the command signals defined below. Little and big endian modes are both supported by the generic bus interface. One skilled in the art will appreciate that little and big endian modes describe the order in which a sequence of bytes are stored in memory. As described in more detail below, the embodiments of the bus interface include a bus interface configured to operate in a synchronous mode and a bus interface configured to operate in an asynchronous mode. In the synchronous mode, the bus cycle can be lengthened through the use of an external WAIT# control signal which can be set to active high or active low. The asynchronous generic bus interface is configured to be independent of the difference between the clock speed of the display controller and the clock speed of the CPU in communication with the display controller. In addition, the asynchronous bus interface includes circuitry for minimizing the occurrence of a metastable condition.

Figure 2:
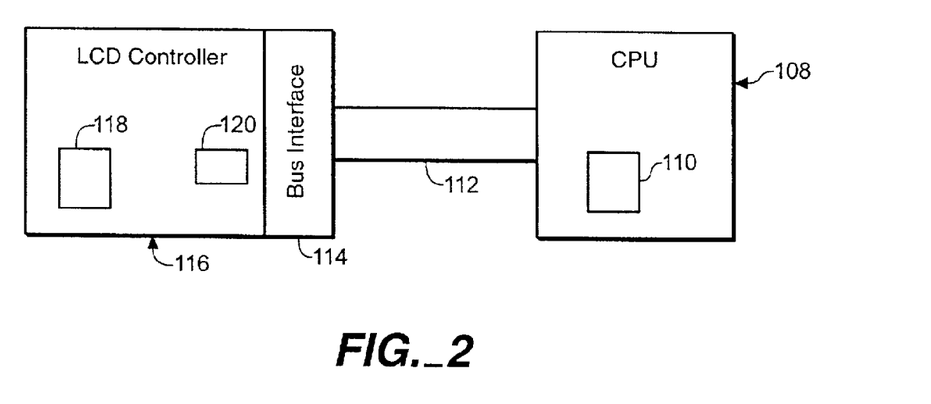
FIG. 2 is a high level schematic diagram of a LCD controller with a generic bus interface in communication with a CPU in accordance with one embodiment of the invention.

FIG. 2 is a high level schematic diagram of a display controller, such as a liquid crystal display (LCD) controller with a generic bus interface in communication with a CPU in accordance with one embodiment of the invention. CPU 108 is in communication with LCD controller 116 through bus 112. CPU can be any number of suitable microprocessors. In one embodiment, CPU 108 is a microprocessor designed for an embedded system. One such embedded system is the HITACHI SH3 microprocessor, which includes a native bus supporting the SH3 microprocessor. It should be appreciated that the HITACHI SH3 microprocessor is mentioned for illustrative purposes only and not meant to be limiting on the invention, as LCD controller 116 includes generic bus interface 114 that is configured to communicate with a variety of suitable CPUs of embedded systems and non-embedded systems. As used herein, LCD controller 116 can be any suitable display controller that may or may not be associated with an embedded system.

Still referring to FIG. 2, LCD controller 116 includes memory core region 118 and register region 120. Memory core region 118 contains the data for an image to be presented on an LCD panel. Register region 120 (also referred to as a register set) contains data to configure LCD controller 116, which includes configuration data for a type of display panel used to display the image, such as resolution, screen size, panel type, etc. That is, the registers of the register set are programmed to allow LCD controller 116 to interface with a display screen for presenting the image data in memory. CPU 108 contains registers that map LCD controller 116 into CPU memory 110. Thus, when CPU memory 110 is addressed, CPU 108 asserts a chip select signal (CS#). In one embodiment, the CS# signal is used to notify LCD controller 116 that the LCD controller is being addressed as will be explained in more detail below.

Figure 3:
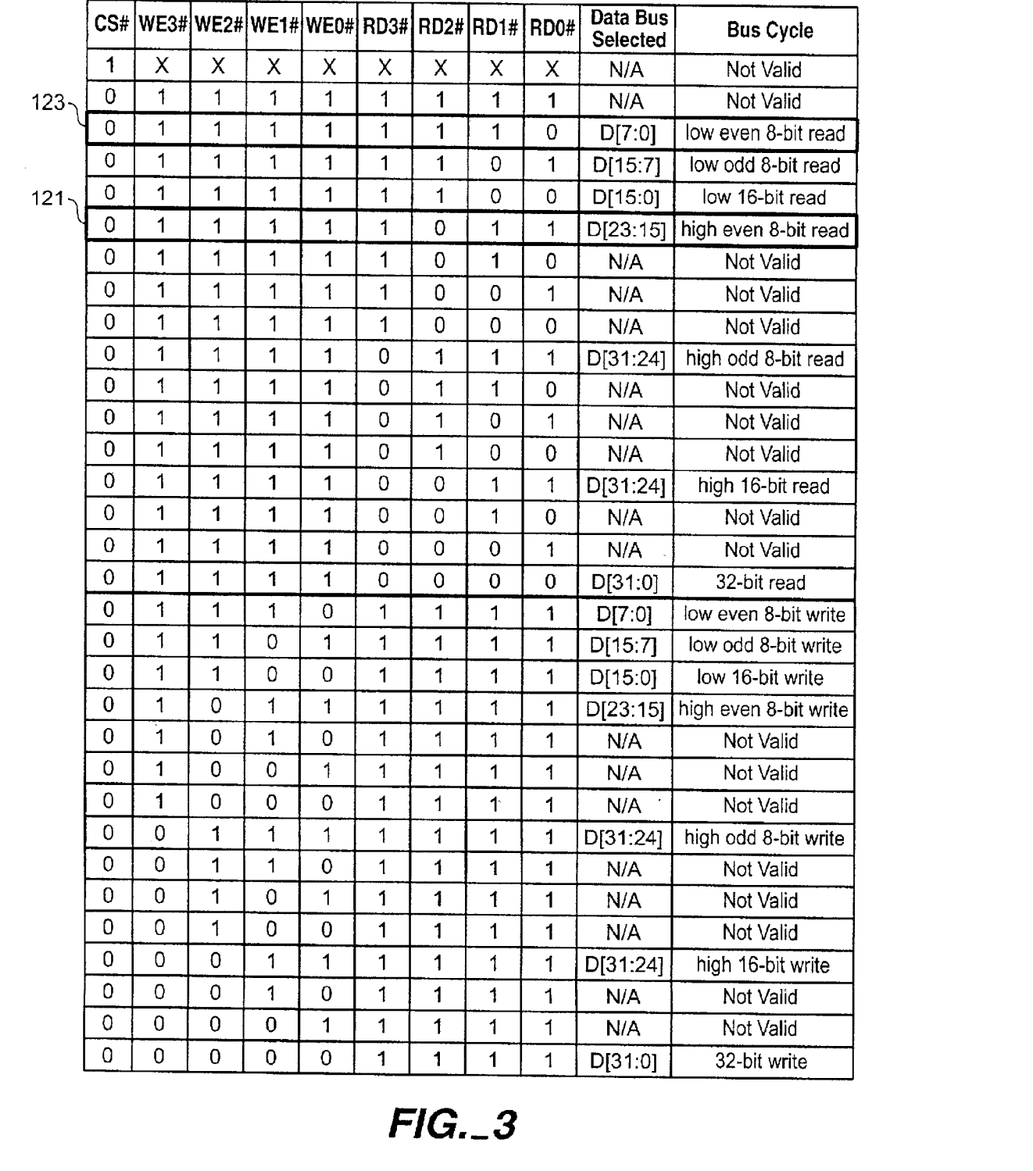
FIG. 3 is a table illustrating the command signals that determine whether the current bus cycle is a read or a write cycle and the location of valid data on the bus in accordance with one embodiment of the invention.

FIG. 3 is a table illustrating a set of command signals that determine whether the current bus cycle is a read or a write cycle and the location of valid data on the bus in accordance with one embodiment of the invention. As will explained below, the same set of signals which specify the read or write cycle simultaneously specify which bytes of a 32 bit data bus contain valid data. Thus, a certain bit width of the 32 bit data bus, i.e., 8 bit, 16 bit, or 32 bit, is specified by the same set of signals specifying whether the bus cycle is a read operation or a write operation. It should be appreciated that each of the command signals define enable data for either the read operation or the write operation.

Still referring to FIG. 3, a bus cycle is initiated when a chip select signal (CS#) is to asserted low. The assertion of one or more read enable signals (RDn#) after the assertion of the CS# specifies a read cycle. Alternatively, the assertion of one or more write enable signals (WEn#) after the assertion of the CS# sets a write cycle. In addition, the configuration of the RD# and the WE# specify which bytes of a 32 bit data bus contain valid data. That is, the read or write cycle can be further specified as a 8-bit, 16-bit or 32-bit read or write cycle. It should be appreciated that by accommodating 8-bit, 16-bit and 32-bit reads and writes, the bus interface of a display controller, such as a liquid crystal display (LCD) controller, is not prevented from communicating with a CPU requiring an interface accommodating 8 bit or 16 bit reads. Therefore, the bus interface of the display controller can interface with a wide variety of microprocessors.

Continuing with FIG. 3, it can be seen that the CS# is active low. For a read cycle, each of the WE# (WE#0–WE#3) are driven high to indicate a read cycle, i.e., where the LCD controller supplies data to a CPU. Alternatively, for a write cycle, each of the RD# (RD#0–RD#3) are driven high to indicate a write cycle, i.e., where a CPU directs data to the LCD controller. As the WE# are all high during a read, the configuration of the RD# signals indicate the location of valid data on the data bus. For example, the command signal encoding for a high even 8 bit read, as defined in row 121, will be explained in further detail to specify the configuration of the command signals. Here, CS# is asserted low indicating that the LCD controller is being selected by the CPU. WE#0–WE#3 are each asserted high to indicate that a read cycle will occur. RD#3, RD#1 and RD#0 are asserted high while RD#2 is asserted low. This combination indicates that valid information is contained over bits 15–23 of the data bus. Thus, the command signals of row 121 define a high even 8 bit read bus cycle. It should be appreciated that one set of command signals define both whether a read operation or a write operation is to be performed and a location of valid data on the data bus through which the display controller and the CPU communicate. That is, one command signal is used for each 8 bit segment for either a read or write operation.

Additionally, each of the command signals of FIG. 3 define enable data for a read operation or a write operation. Thus, WE#0–WE#3 define enable data for a write operation while RD#0–RD#3 define enable data for a read operation. Consequently, the bus interface is capable of performing on command modifiable reads and writes to accommodate a broad variety of CPUs. That is, the bus interface is not limited to a 32 bit read operation, therefore, the bus interface is capable of communicating with a CPU interface requiring an 8 bit, 16 bit or 32 bit read. It should be appreciated that the set of command signals may be defined with the logical high and low values, illustrated in FIG. 3, reversed.

Figure 4:
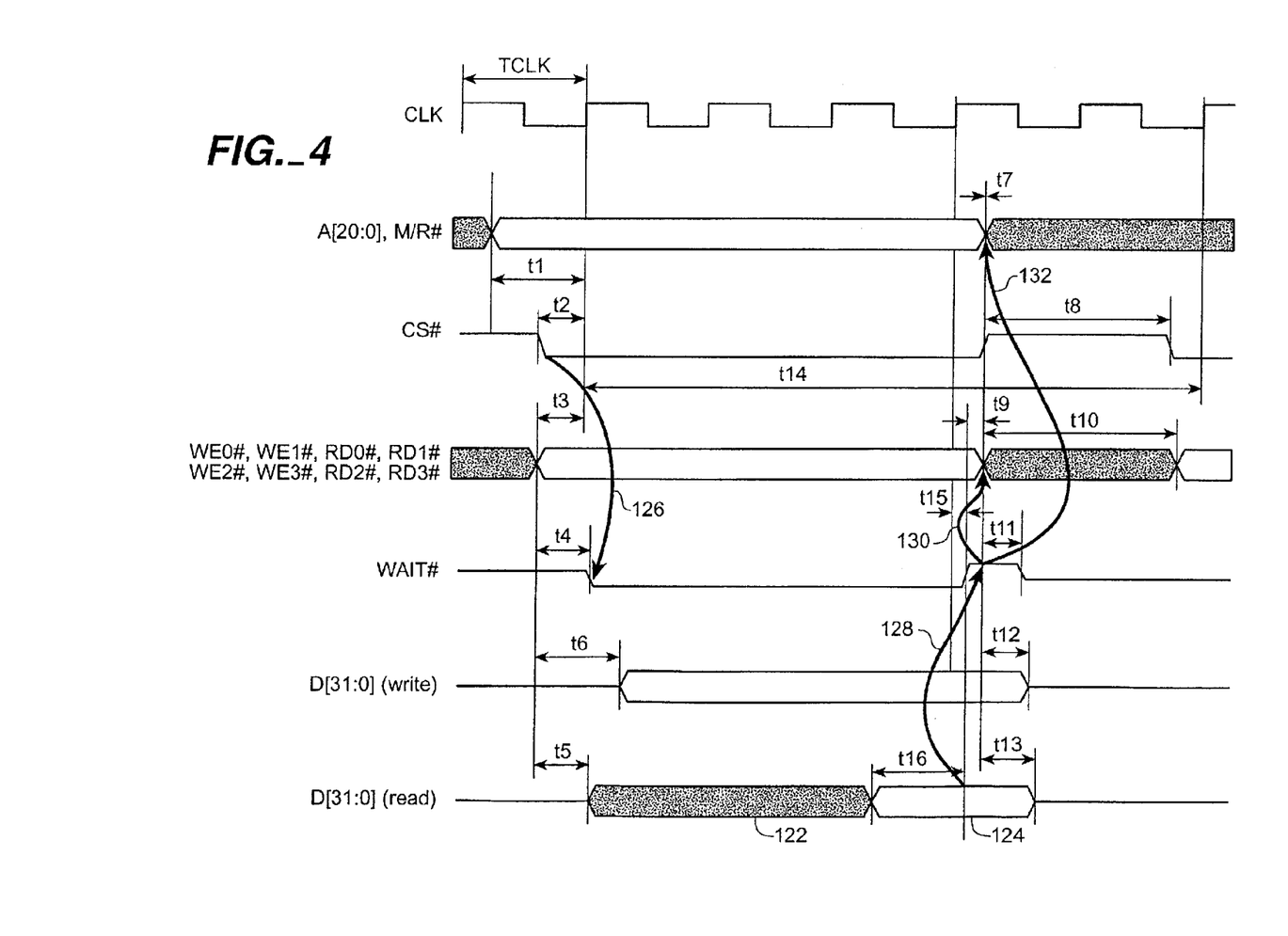
FIG. 4 is a timing diagram for a generic bus interface associated with the command signals that determine whether the current bus cycle is a read or a write cycle and to determine a location of valid data on the bus in accordance with one embodiment of the invention.

FIG. 4 is a timing diagram for a generic bus interface associated with the command signals that determine whether the current bus cycle is a read or a write cycle and determine a location of valid data on the bus in accordance with one embodiment of the invention. Bus clock period (TCLK) is indicative of the system speed for the bus clock (CLK). For exemplary purposes, the LCD controller includes 21 bits of address space, as represented by A[20:0], which determines the amount of memory within the LCD controller. It will be apparent to one skilled in the art that the amount of address space of the LCD controller may vary. In one embodiment, the LCD controller has about 2 Megabytes (MB) of memory. That is, 21 bits of address space maps out to about 2 MB of memory. The memory inside the LCD controller is addressed through address lines A[20:0]. One skilled in the art will appreciate that the LCD controller can contain any amount of memory suitable for the system containing the LCD controller and is not limited to 2 MB of memory. Memory/Register signal (M/R#) is a signal that selects between memory (M) and registers (R) of the LCD controller. In one embodiment, an additional 2 MB of memory is provided through the M/R# pin. As mentioned above, the memory core contains image data to be presented while the registers include configuration data, such as the configuration data for the display screen where the data is to be displayed. It will be apparent to one skilled in the art that the bus interface described in reference to FIG. 4 is a synchronous bus interface as the CPU and the display controller share a common clock.

Referring to FIG. 2, CPU 108 includes registers that map LCD controller 116 into memory 110 of the CPU. Thus, when CPU memory 110 is addressed, the CPU 108 asserts a CS# low which tells LCD controller 116 that the LCD controller is being selected. Of course, the CS# signal can be asserted low or high to indicate that LCD controller 116 is being selected. Returning to FIG. 4, the signals are sampled on the rising edge of the clock, however, it will be apparent to one skilled in the art that the signals can be sampled on the falling edge of the clock. When sampling signals on the rising edge of the clock, parameter t2 indicates a set up time for the bus clock to see the CS# go low. The configuration of command signals, WE0#, WE1#, WE2#, WE3#, RD0#, RD1#, RD2# and RD3#, indicates a type of access, i.e., read operation or a write operation. For example, with reference to FIG. 3, a command signal where RD3# is 0 (low) and the remaining read and write signals are 1 (high) indicates that the type of access is a high odd 8-bit read. Accordingly, data bits 31 through 24 of the bus are selected as these bits have valid data on them as defined by the command signals. Thus, the CPU samples bits 31–24 of the data bus during the read operation.

Parameter t1 of FIG. 4 represents a set up time for the LCD chip to see the CS# go low and to determine if a read operation or write operation is to occur through the configuration of the WE# or the RD#. It will be apparent to one skilled in the art that the set up time ensures that CS# will be sampled in the desired state. Set up time t3 allows a window for the read and write command signals to be asserted before the display controller samples the read and write command signals. For exemplary purposes, command signals configured to define a low even 8 bit read operation, as specified in row 123 of FIG. 3, will be referenced to further explain the timing diagram of FIG. 4 with reference to a read operation. Furthermore, it will be apparent to one skilled in the art that the set up and hold times referred to herein accommodates a propagation delay from when a high or low signal is sampled to when a next action occurs based on the high or low signal.

Still referring to FIG. 4, when CS# goes low, a wait signal (WAIT#) is driven low within timing parameter t4, as indicated by arrow 126. WAIT# is output from the display controller, such as a LCD controller, to the CPU and requests that the CPU wait until the LCD controller is ready to supply data. One skilled in the art will appreciate that for a read operation, the LCD controller is supplying data to the CPU. While WAIT# is low, the CPU extends the cycle until the LCD controller is ready to supply the data. Thus, the CPU will continue sampling the WAIT# and extending the cycle until WAIT# goes high. WAIT# goes high when valid data has been put onto the bus as indicated by arrow 128. On the rising edge of the bus clock, the CPU will sample the WAIT# and see that WAIT# has gone high, therefore, the CPU can read the data contained over bits 0–7 for the low even 8-bit read specified by the command signals. The valid data is supplied to the CPU during timing parameter t13 of the read cycle. As mentioned above, the CPU or the LCD controller can be configured to sample on the falling edge of the clock cycle rather than the rising edge.

Continuing with FIG. 4, timing parameter t5 of the read cycle defines a time period within which the LCD controller will drive the data bus. Dark envelope 122 indicates that the LCD controller is driving the data bus, thereby preventing another controller from taking over the bus. The dark envelopes of FIG. 4 represent that valid data is not available while the light envelopes represent that valid data is available. Thus, valid read data becomes available at some point within light envelope 124. Timing parameter t6 provides a set up time for the WAIT# to go high in order for the CPU to read the data. Therefore, during timing parameter t13 data is transferred, i.e., the CPU latches the data, as the rising edge of the bus clock occurs with the WAIT# high. It should be appreciated that within timing parameter t11, WAIT# is driven to a high impedance state where control of the bus is relinquished by the LCD controller for use by other devices.

For a write operation, with reference to FIG. 4, the CPU is directing data over the bus to the LCD controller. The CS# is driven low as mentioned above and is sampled by the LCD controller. Set up time t3 allows a window for the read and write command signals to be asserted before the LCD controller samples the read and write command signals. The configuration of the read and write command signals will indicate the type of access. For exemplary purposes, the 32-bit write of FIG. 3 will be used to describe an exemplary write operation. That is, command signals WE0#, WE1#, WE2#, and WE3# are all low (0 values) while RD0#, RD1#, RD2# and RD3# are all high (1 values). Therefore, all 32 bits on the data bus are valid. At the same time that the read and write command signals are sampled, the address will be sampled to determine where the data is being addressed in the memory core of the LCD. For a write operation, the CPU drives the read enable signals high. As mentioned above, for the 32-bit write all four write enable signals (WE0#–WE3#) are driven low indicating that all 32 bits on the data bus are valid. The WAIT# is driven low to extend the bus cycle until valid data is available. Timing parameter t6 defines a set up period within which the CPU must drive the data on the data bus. WAIT# is held low until the LCD controller is ready to receive data at which point WAIT# is driven high. When WAIT# is driven high, the data is sampled and latched in by the LCD controller.

Still referring to FIG. 4, timing parameter t12 is a hold time. As mentioned above, there is some propagation delay between the sampling of a signal and the action resulting from the sampling. Thus, t12 is a hold time defining a time period for data to be held after the LCD controller is ready to receive the data, i.e., the WAIT#. Driving WAIT# high signifies that data has been written. Similar to the read operation, once WAIT# has been deasserted (driven high), the CPU ends the cycle by deasserting the read or write strobe as indicated by line 130. Additionally, the CPU deasserts the CS#, by driving CS# high as indicated by line 132. Timing parameter t9 represents the time period between the WAIT# being deasserted and the read cycle or write cycle being deasserted.

Figure 5:
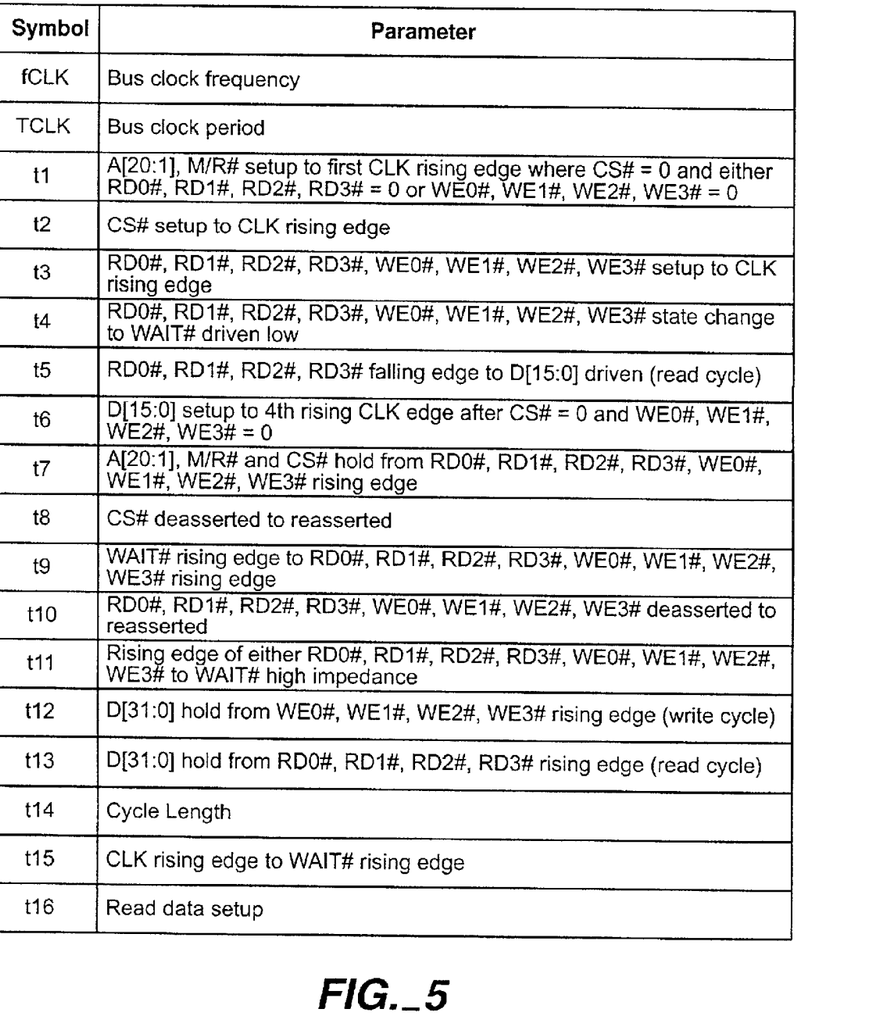
FIG. 5 is a table listing the bus interface timing parameters associated with FIG. 4.

FIG. 5 is a table listing the timing parameters associated with FIG. 4. Timing parameters t1–6, t9, t11–13 and t16 are discussed above with respect to FIG. 4. Timing parameter t7 represents a time period to keep the current cycle active, i.e., CS# low, after the CPU deasserts the command signals. The minimum time for parameter t7 is zero nanoseconds (ns), however, one skilled in the art will appreciate that most CPUs do not deassert CS# until one or two clocks after the command signals are deasserted. Thus, the LCD controller is capable of handling concurrent deassertion of the command signals and CS# from the CPU, as well as deassertion of CS# after the command signals are deasserted. Timing parameter t8 represents a time period for which the CS# is deasserted (held high). At the end of time period t8, the CS# signal is reasserted, thereby signifying to the LCD controller that it has been selected for another read or write operation. Timing parameter t10 indicates a time period from which the command signals are deasserted to a point where the command signals are reasserted for another read or write operation. Time period t14 represents the length of a cycle for a read or write operation. Timing parameter t15 signifies a time period between the rising edge of the bus clock and the WAIT# being driven high. It should be appreciated that the timing parameters are exemplary timing periods and that the actual time period associated with each timing parameter can be any suitable time period allowing each operation to be accomplished.

Figure 6:
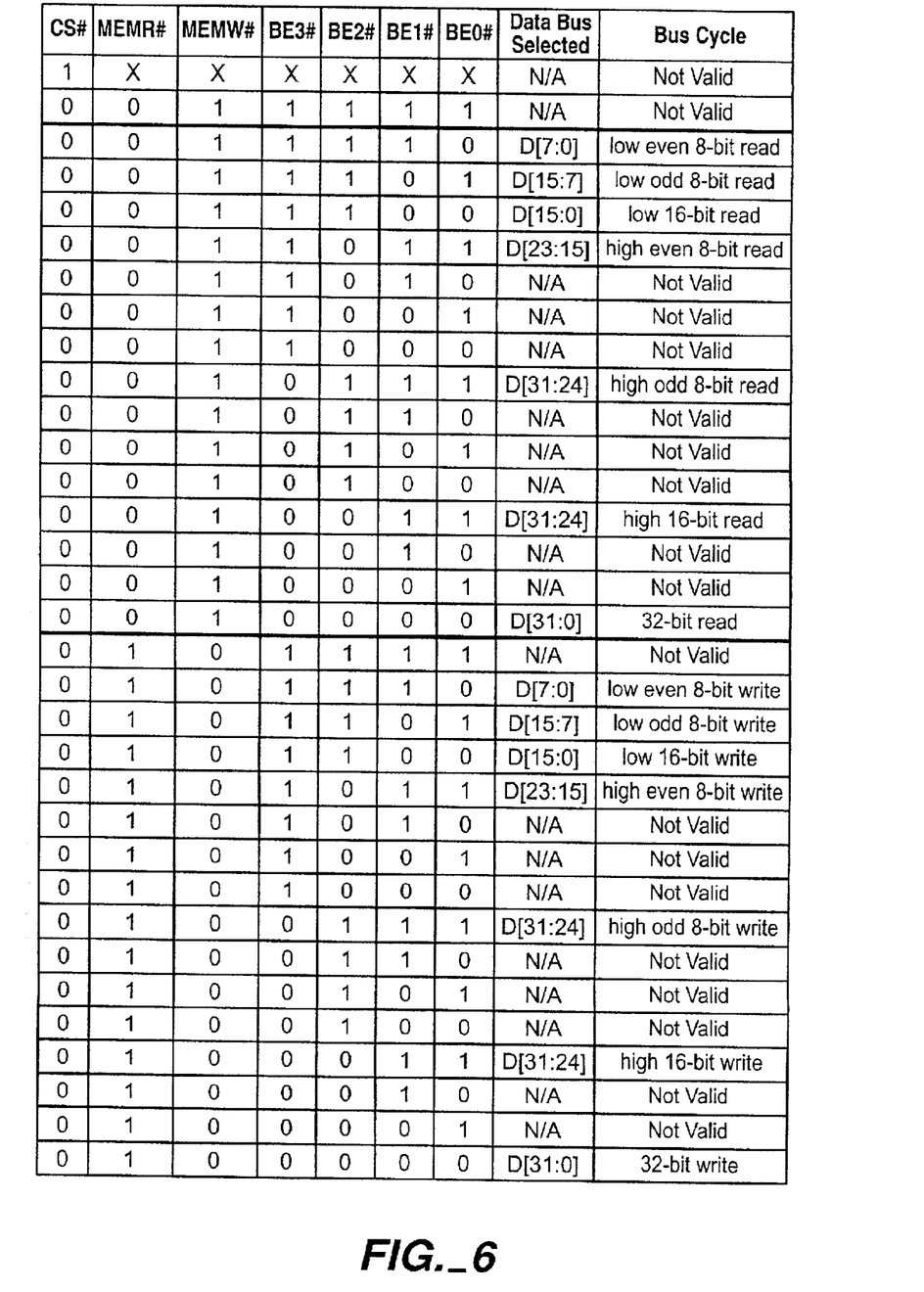
FIG. 6 is a table illustrating the command signal encoding that utilizes two sets of control signals to determine whether the current bus cycle is a read operation or a write operation and the location of valid data on the bus in accordance with one embodiment of the invention.

FIG. 6 is a table illustrating the command signal encoding that utilizes two sets of control signals to determine whether the current bus cycle is a read operation or a write operation and the location of valid data on the bus in accordance with one embodiment of the invention. The command signals of FIG. 6 are all active low. A chip select signal (CS#) is driven low to indicate that the LCD controller has been selected. The assertion of the read control signal (MEMR#) indicates a read cycle while the assertion of the write control signal (MEMW#) indicates a write cycle. It should be appreciated that the MEMR# and MEMW# have no effect on the determination of which parts of the data bus contain valid data. That is, the MEMR# and MEMW# do not include enable data corresponding to the data associated with the read operation or the write operation. Four byte enable signals (BE#) are used to specify which bytes of a 32 bit data bus contains valid data. Thus, an 8 bit, 16 bit or 32 bit read bus cycle or write bus cycle can be specified as indicated by the various combinations of BE0#–BE3#.

Figure 7:
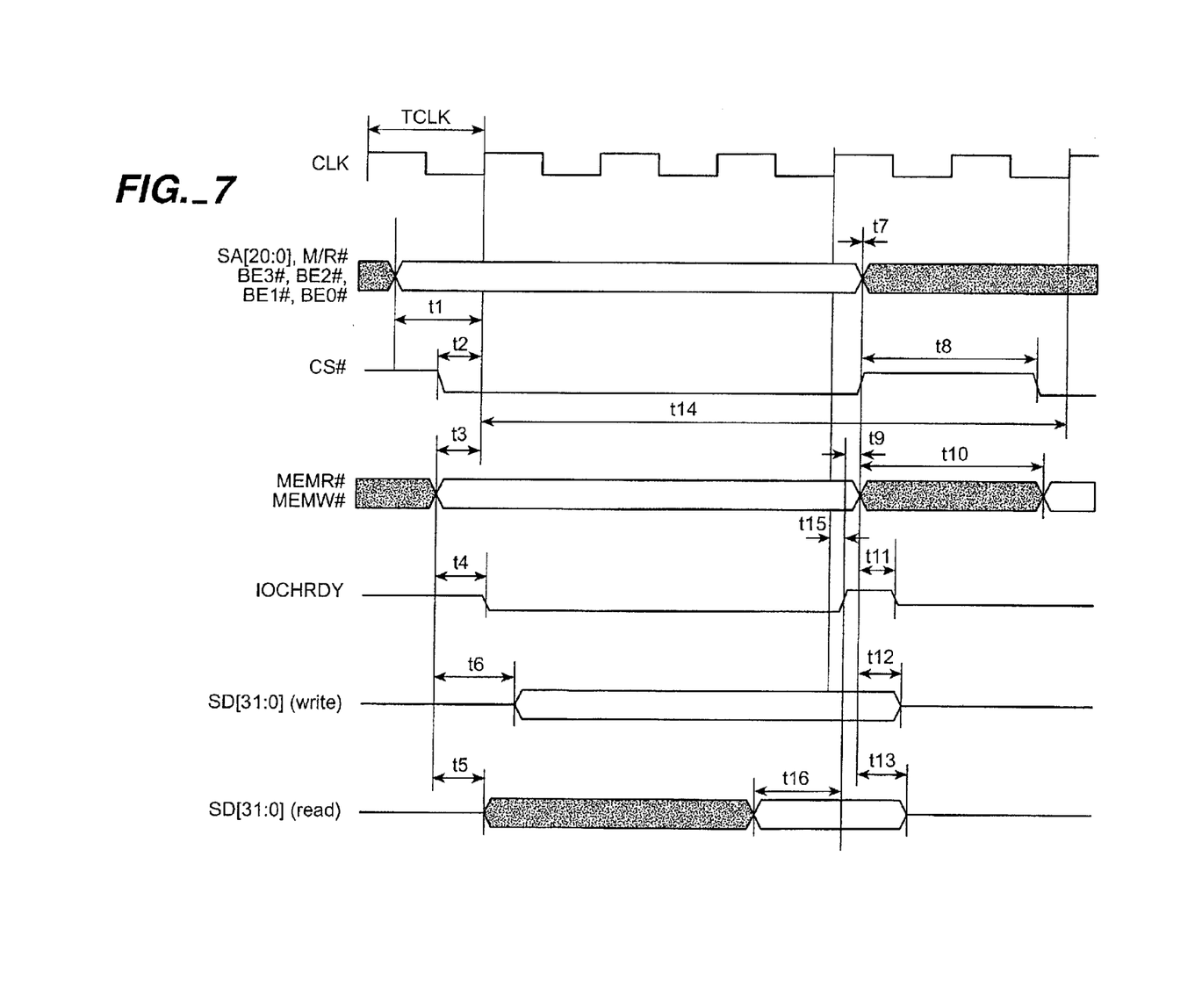
FIG. 7 is a timing diagram for a generic bus interface using separate control signals and enable signals, as discussed with reference to FIG. 6, to define a bus cycle in accordance with one embodiment of the invention.

FIG. 7 is a timing diagram for a generic bus interface using separate control signals and enable signals, as discussed with reference to FIG. 6, to define a bus cycle in accordance with one embodiment of the invention. The bus interface supports a data width of 32 bits addressable over 21 bits of address space. As mentioned previously, the bus interface is not limited to 21 bits of address space as 21 bits of address space is shown here for exemplary purposes only. One skilled in the art will appreciate that the bus interfaces described herein can have up to 32 bits of address space. Little and big endian modes are both supported by the bus interface. A bus cycle starts with the chip select signal (CS#) asserted low followed by the assertion of the MEMR# or the MEMW#. Once the CS# signal is recognized, an output signal (IOCHRDY#) is asserted to acknowledge the CS#. One skilled in the art will appreciate that that the IOCHRDY# performs the same function as the WAIT# with respect to FIGS. 4 and 5.

Still referring to FIG. 7, the IOCHRDY# is asserted until valid data is ready to be driven onto the bus for a read cycle or when data has been successfully received for a write cycle. The bus cycle can be lengthened by the IOCHRDY#. The configuration of the byte select signals BE0#–BE3#, in conjunction with MEMR# and MEMW#, with reference to FIG. 6, determines if the data bus bits are driven, i.e., a read operation, or sampled, i.e., a write operation. Once the CPU clock sees the IOCHRDY# deasserted, the CS# and the command signals (BE0#–BE3# and MEMR# or MEMW#) are deasserted to end the bus cycle. The address used for the bus cycle is sampled once after the start condition (CS# driven low) is recognized. Address bits A0 and A1 of the 21 bits of address space are not used in the bus interface in one embodiment since the byte enable signals determine the lower address bits. It will be apparent to one skilled in the art that the bus interface described with respect to FIGS. 6 and 7 is not capable of interfacing with as broad a variety of CPUs as the bus interface described with respect to FIGS. 3–5. The set of command signals associated with FIGS. 3–5 allows the bus interface to communicate with a broader range of CPUs. However, it should be appreciated that the command signals for both of the above referenced interfaces allows for on command modifiable reads. That is, for a 32 bit bus an 8, 16, or 32 bit read can be performed.

Figure 8:
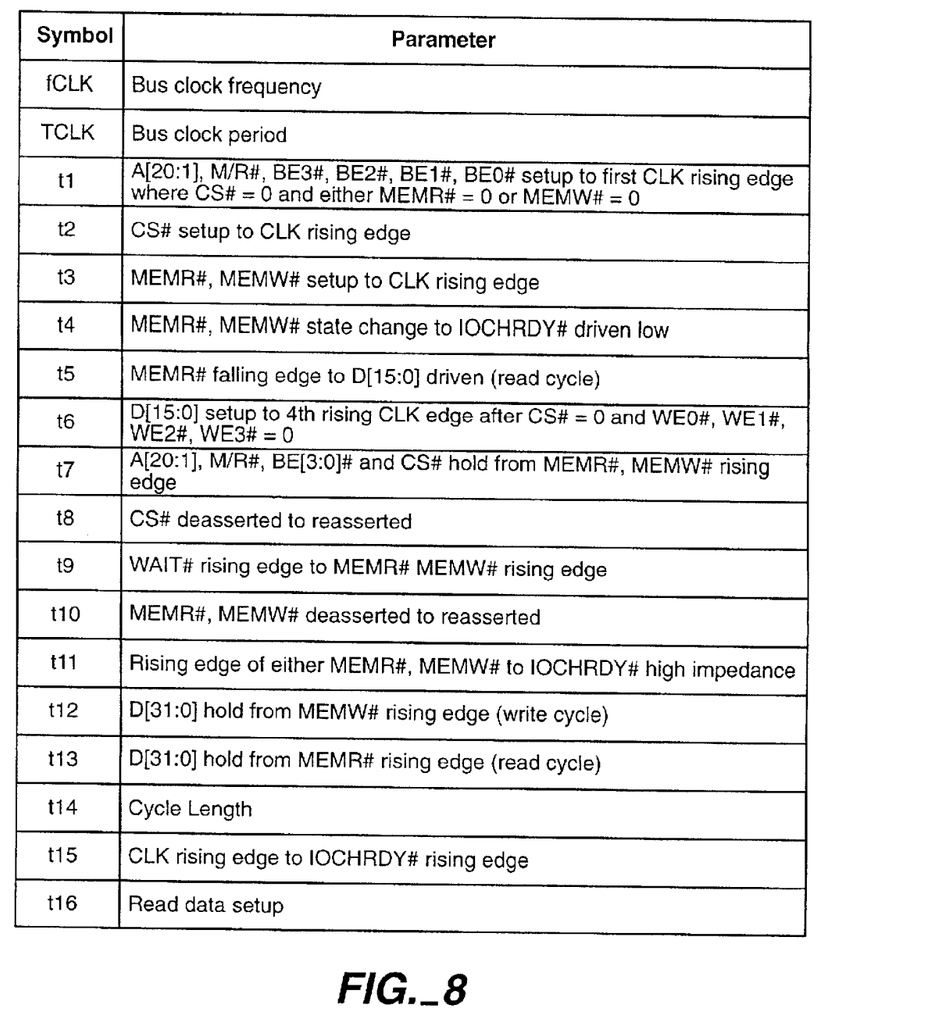
FIG. 8 is a table representing the bus interface timing parameters associated with FIG. 7.

FIG. 8 is a table representing the bus interface timing parameters associated with FIG. 7. The timing parameters of FIG. 8 correlate with the timing parameters of FIG. 5. Of course, the command signals associated with FIG. 5 and the command signals associated with FIG. 7 are different. That is, the set of command signals associated with FIG. 5 are configured to indicate a read operation or write operation and a location of valid data on the bus. Furthermore, each of the command signals of FIG. 5 are configured to concurrently define read or write enable data as discussed with respect to FIG. 3. On the other hand, the command signals associated with FIG. 8 include separate sets of signals to define if the bus cycle is a read or write operation and the location of valid data on the bus.

Figure 9:
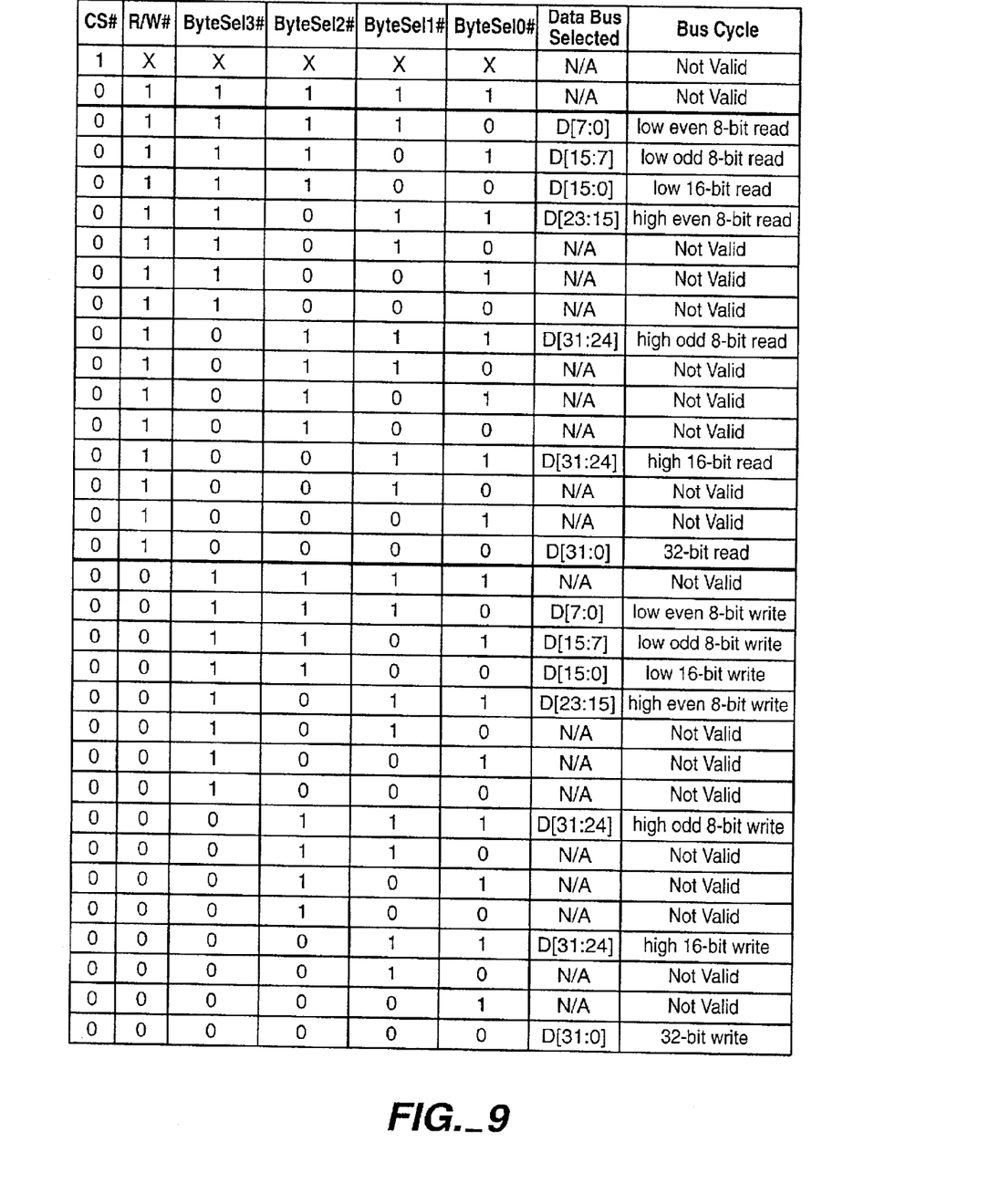
FIG. 9 is a table illustrating the command signal encoding for an asynchronous generic bus interface that determines whether the current bus cycle is a read or a write cycle and the location of valid data on the bus in accordance with one embodiment of the invention.

FIG. 9 is a table illustrating the command signal encoding for an asynchronous generic bus interface that determines whether the current bus cycle is a read or a write cycle and the location of valid data on the bus in accordance with one embodiment of the invention. The command signals of FIG. 9 are all active low. A chip select signal (CS#) is driven low to indicate that the LCD controller has been selected. A read/write control signal (R/W#) is used to indicate whether a read cycle or a write cycle is to be performed. Driving the RW# signal high indicates a read cycle will be performed, while driving the RW# low indicates a write cycle will be performed. It should be appreciated that the R/W# is not related to the determination of which parts of the data bus contain valid data. That is, the R/W# does not include enable data corresponding to the data associated with the read operation or the write operation. Four byte select signals (ByteSeln#) are used to specify which bytes of a 32 bit data bus contains valid data. Thus, an 8 bit, 16 bit or 32 bit read bus cycle or write bus cycle can be specified as indicated by the various combinations of ByteSel0#–ByteSel3#.

Figure 10:
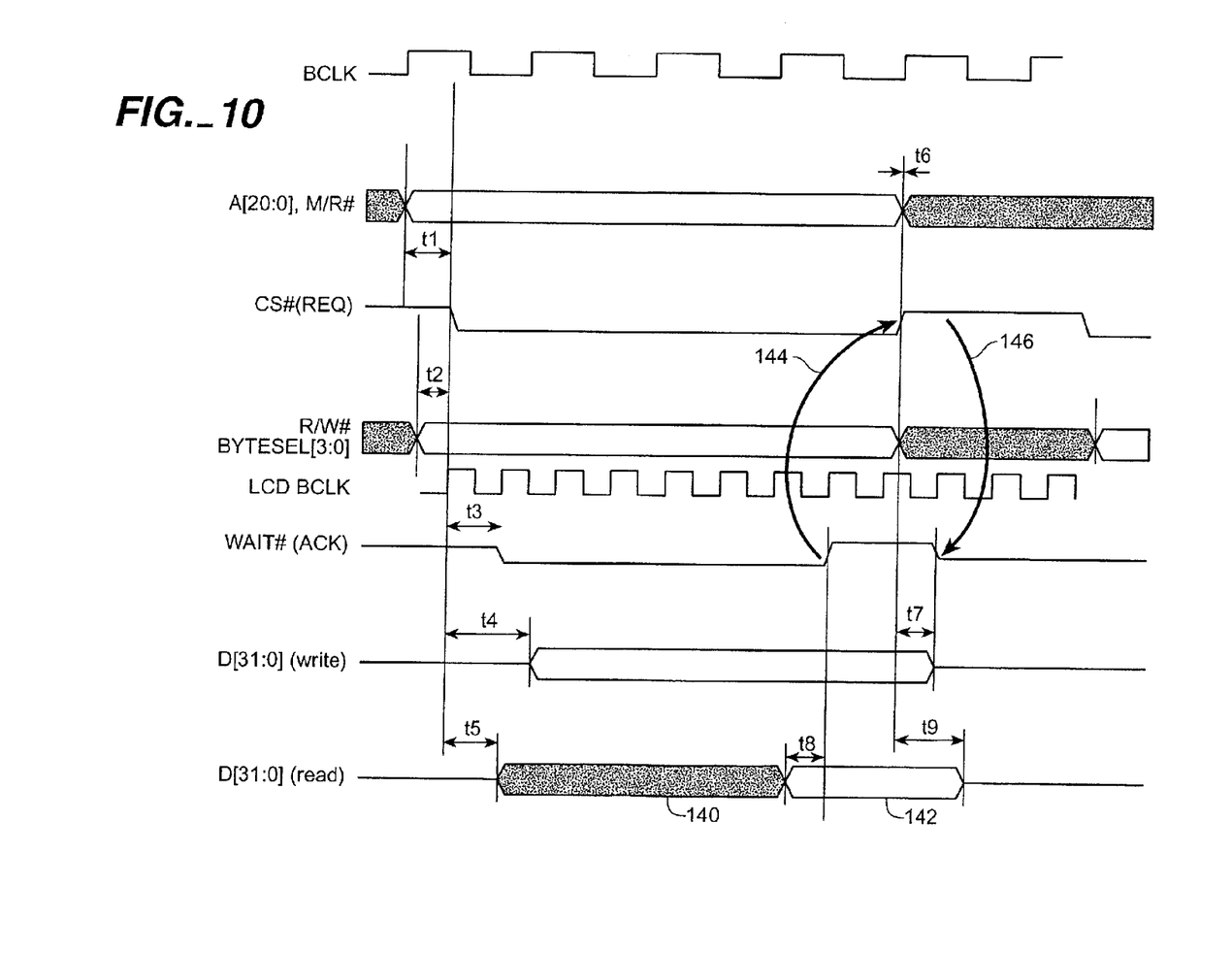
FIG. 10 is a timing diagram of an asynchronous generic bus interface of a display controller configured to support any difference in clock speed between the display controller and a CPU in communication with the display controller in accordance with one embodiment of the invention.

FIG. 10 is a timing diagram of an asynchronous generic bus interface of a display controller configured to support any difference in clock speed between the display controller and a CPU in communication with the display controller in accordance with one embodiment of the invention. A bus cycle initiates with CS#, also referred to as a request, asserted low by the bus master, i.e., CPU. After this start condition is recognized, the bus slave, i.e., LCD controller, acknowledges the request by asserting the WAIT#, referred to as acknowledge. The WAIT# is asserted until valid data is ready to be driven onto the bus for a read cycle or when data has been successfully received for a write cycle. Of course, the R/W# determines if the access is a read operation or a write operation and the configuration of ByteSel0#–ByteSel3# define which data bus bits are driven or sampled. After the bus master sees WAIT# deasserted, the bus master will deassert the CS# and the command signals. The address used for the bus cycle is sampled once after the start condition is recognized. It should be appreciated that address bits A0 and A1 are not used in the bus interface in one embodiment since the byte select signals determine the lower address bits.

Still referring to FIG. 10, an exemplary read operation will be explained. Bus clock (BCLK) is the clock controlling the bus master, i.e., CPU, while LCD BCLK is the clock controlling the bus slave, i.e., display controller, such as a LCD controller. As an exemplary illustration, the LCD controller includes 21 bits of address space, as represented by A[20:0], which determines the amount of memory within the LCD controller. As mentioned above, the LCD controller is not limited to 21 bits of address space as the amount of address space can vary. In one embodiment, the LCD controller has about 2 Megabytes (MB) of memory. That is, 21 bits of address space maps out to about 2 MB of memory. The memory inside the LCD controller is addressed through address lines A[20:0]. One skilled in the art will appreciate that the LCD controller can contain any amount of memory suitable for the system containing the LCD controller and is not limited to 2 MB of memory. Memory/Register signal (M/R#) is a signal that selects between memory (M) and registers (R) of the LCD controller. In one embodiment, an additional 2 MB of memory is provided through the M/R# pin. As mentioned above, the memory core contains image data to be presented while the registers include configuration data. It should be appreciated that the asynchronous bus interface is truly asynchronous as the timing of the signals to the bus interface from the LCD controller are controlled by the LCD clock. That is, the signals to the bus interface from the LCD controller are independent of the CPU clock. As a result, the signals from the LCD controller are not slaved to a single CPU clock or oscillator, thus defining a truly asynchronous bus interface.

The CPU requests the cycle from the LCD controller by asserting CS# low. The LCD controller responds to the request with an acknowledge signal, i.e., WAIT#. It should be appreciated that the request and acknowledge signals are the two handshaking signals used to initiate a bus cycle. Furthermore, while the CPU issues the request according to the CPU clock, the LCD controller samples the request at the clock speed of the LCD controller. That is, the LCD controller is sampling the request on the rising edge of the LCD BCLK, which is independent of the BCLK for the CPU. Of course, the LCD controller can sample on the falling edge of the LCD BCLK also. Timing parameter t3 represents the time period between the LCD controller sampling CS# low and asserting WAIT# to acknowledge to the CPU that a sample is being requested. The acknowledge signal starts the bus cycle for the LCD controller. It will be apparent to one skilled in the art that t3 is variable depending on the speeds of the CPU and the LCD controller. The CPU then responds with a R/W# indicating a read or a write operation and ByteSel0#–ByteSel3# indicating the location of valid data on the data bus.

For a read cycle, with reference to FIG. 10, timing parameter t5 represents the time period within which the LCD controller will drive the data bus. Dark envelope 140 indicates that the LCD controller is driving the data bus, thereby preventing another controller from taking over the bus. The dark envelopes of FIG. 10 represent that valid data is not available while the light envelopes represent that valid data is available. Thus, valid read data becomes available at some point within light envelope 142. Timing parameters t8 and t9 represent the set up time and hold time, respectively, similar to timing parameters t16 and t13 of FIG. 4. The end of the internal cycle for the LCD controller occurs when the WAIT# is deasserted, i.e., WAIT# goes high, which is performed by the LCD controller according to the LCD BCLK. Thereafter, the CPU will see the WAIT# go high when the CPU samples the WAIT# on the rising edge of the BCLK and will acknowledge back to the LCD controller by deasserting CS#. Thus, the bus cycle is completed from the CPU side. Here, a similar handshaking procedure occurs to end the cycle as the handshaking procedure that initiates the cycle, with the exception that the LCD controller issues a request by asserting WAIT# high and the CPU acknowledges the request by asserting CS# high. It should be appreciated that timing parameter t9 defines a hold time after the CS# has gone high in order to guarantee that data is available for the CPU to sample that data. Arrow 144 indicates the WAIT# being driven high by the LCD controller and the high WAIT# being recognized by the CPU which in turn drives the CS# high. It should be appreciated that the WAIT# is driven according to the clock of the LCD controller and is not synchronous to the CPU clock, thereby allowing the bus interface to run at any clock speed, i.e., independent of the CPU's clock speed. Once the LCD controller sees the CS# go high the LCD controller releases the bus by driving WAIT# to a high impedance state as indicated by arrow 146.

Still referring to FIG. 10, a write operation follows a similar handshaking method as the read operation. Timing parameter t4 defines a set up period within which the CPU must drive the data on the data bus, while timing parameter t7 is a hold time defining a time period for data to be held after the LCD controller is ready to receive the data, i.e., the WAIT# is driven high. It should be appreciated that timing parameters t4 and t7 are similar to timing parameter t7 and t12, respectively, of FIG. 4. In order to minimize the possibility of any metastability conditions occurring, two flip flops in series are provided within the circuitry of the LCD controller for receiving the command signals, such as M/R# and the command signals of FIG. 9, i.e., CS#, R/W#, and ByteSeln#. Thus, the flip flops in series allow for double sampling of the command signals. That is, the command signals are processed through at least two flip flops connected in series to minimize a metastable condition.

Figure 11:
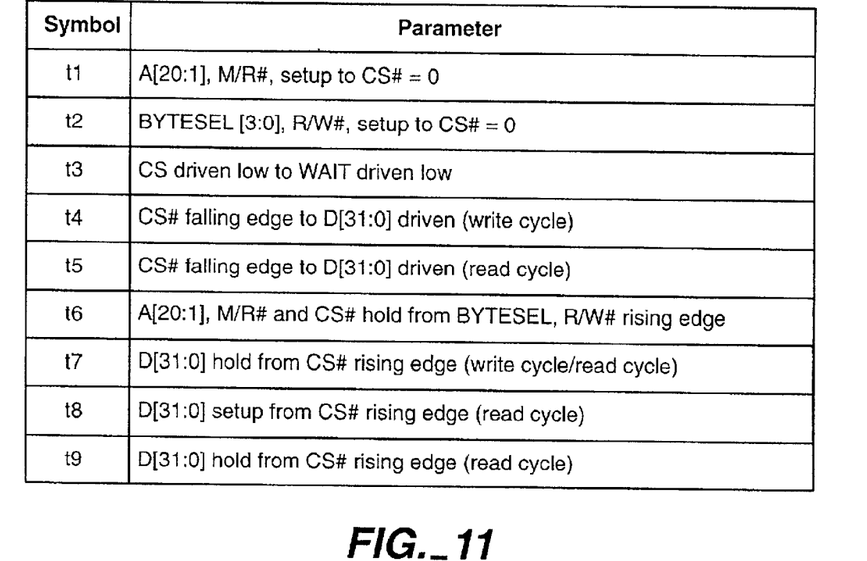
FIG. 11 is a table representing the asynchronous bus interface timing parameters of FIG. 10.

FIG. 11 is a table representing the asynchronous bus interface timing parameters of FIG. 10. Timing parameters t3–t5 and t7–t9 have been discussed above with reference to FIG. 10. Timing parameter t1 defines a setup time. Thus, parameter t1 allows a time period for CS# to go low. Timing parameter t2 indicates a setup time for LCD BCLK to see CS# go low. Parameter t6 indicates a time period required to keep the current cycle active, i.e., CS# low, after the CPU deasserts the command signals. The minimum time for parameter is zero nanoseconds (ns), however, one skilled in the art will appreciate that most CPUs do not deassert CS# until one or two clocks after the command signals are deasserted.

Figure 12:
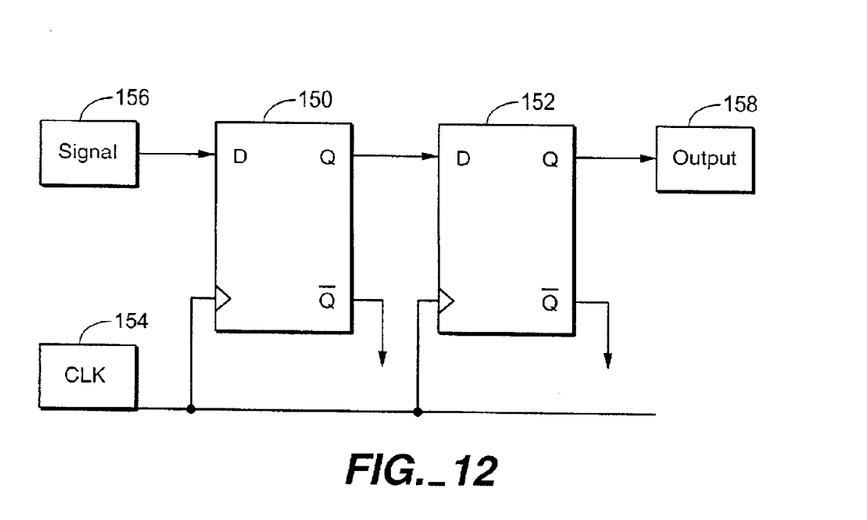
FIG. 12 is a schematic diagram of flip flop chain redundancy circuitry configured to minimize the occurrence of any metastable condition in accordance with one embodiment of the invention.

FIG. 12 is a schematic diagram of flip flop chain redundancy circuitry configured to minimize the occurrence of any metastable condition in accordance with one embodiment of the invention. Flip flop 150 is arranged in series with flip flop 152. Clock 154 is the display controller clock, as flip flops 150 and 152 are contained within the circuitry of the bus interface of the display controller. Signal 156 is the D input of flip flop 150. The data present at the D input of flip flop 150 is transferred to the Q output of flip flop 150. The Q output of flip flop 150 is then provided as the D input of flip flop 154. The D input of flip flop 154 is transferred to the Q output of flip flop 152 where it is output as output signal 158. Thus, should input signal 156 change during the set up time, a metastable condition may occur. For example, with respect to an asynchronous bus interface, the rising edge of the bus clock and the display controller clock may occur at about the same instant, resulting in two infinite slopes causing a metastable condition. One skilled in the art will appreciate that if a metastable condition occurs and the output from flip flop 150 floats, i.e. is not a 0 or 1, the circuitry within flip flop 152 is configured to output a 0 or a 1 depending on the level at which the output from flip flop 150 floats. It should be appreciated that while two flip flops are shown in FIG. 12, any number of flip flops arranged in series could be used. In one embodiment, the flip flop chain redundancy circuitry is configured to process the command signals and not the read or write data.

Figure 13:
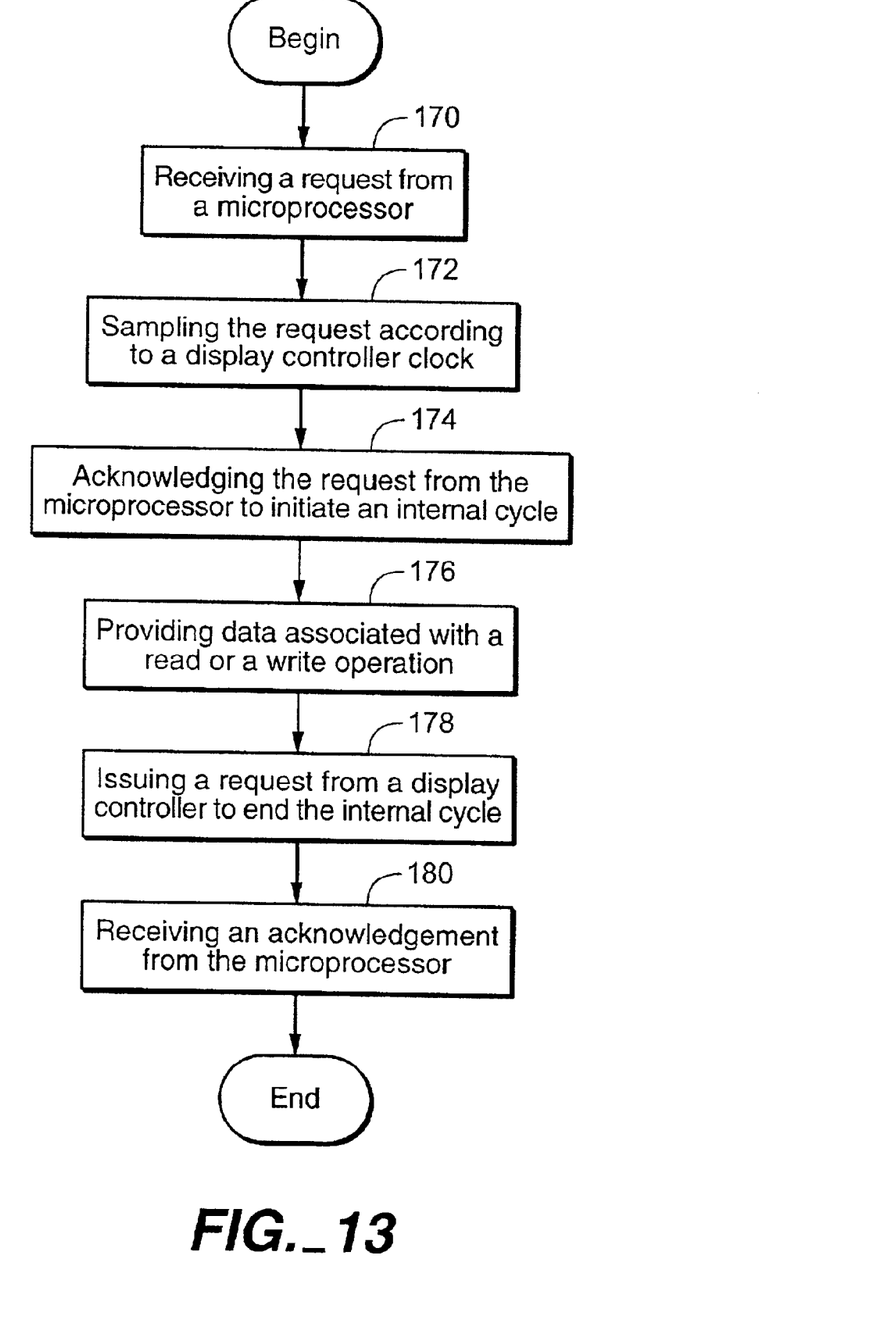
FIG. 13 is a flowchart diagram illustrating the method operations for communicating between a display controller operating at a first clock speed and a microprocessor operating at a second clock speed in accordance with one embodiment of the invention.

FIG. 13 is a flowchart diagram illustrating the method operations for communicating between a display controller operating at a first clock speed and a microprocessor operating at a second clock speed in accordance with one embodiment of the invention. The flowchart initiates with method operation 170 where a request from a microprocessor is received. The request is achieved by the microprocessor driving CS# low and thus starts the bus cycle for the microprocessor. As mentioned above CS# being driven low indicates that the display controller is being selected. As the request is issued by the microprocessor, the request is generated at the clock speed of the microprocessor. The method then advances to operation 172 where the request is sampled according to a display controller clock. Here, a display controller, such as a LCD controller, samples the request as discussed above with reference to FIG. 10. It should be noted that the microprocessor clock and the display controller clock can operate at any difference in clock speed. In one embodiment, the CPU and the microprocessor are part of an embedded system for a handheld computing device.

The method of FIG. 13 then proceeds to operation 174 where the request from the microprocessor is acknowledged to initiate an internal cycle of the display controller. For example, the initiation of the internal cycle of the display controller is illustrated by the region of the timing diagram of FIG. 10 where WAIT# is driven low. The display controller sends the acknowledgement, therefore, the acknowledgement is generated according to the clock of the display controller. Thus, the bus interface can be run at any clock speed independent of the CPU's bus speed.

Still referring to FIG. 13, the method proceeds to operation 176 where data associated with a read or a write operation is provided. The data is provided to the microprocessor for a read operation, while the data is provided to the display controller for a write operation. The parameters of the read or write operation are discussed above with respect to FIG. 10. The method then moves to operation 178 where the display controller issues a request to end the internal cycle. In one embodiment, the request is performed by driving WAIT# high as illustrated with respect to FIG. 10. Of course, the request is issued at the clock speed of the display controller. The method then advances to operation 180 where an acknowledgment from the microprocessor is received by the display controller. The microprocessor samples the request from operation 180 at the clock speed of the microprocessor, and in response drives CS# high (the acknowledgement) as illustrated with reference to FIG. 10. The display controller then samples CS# high (the acknowledgement) at the clock speed of the display controller. As a result of the CS# driven high, the microprocessor ends the microprocessor bus cycle.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent from the foregoing description that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A display controller configured to communicate with a microprocessor; the display controller comprising:
    a memory core for storing image data to be displayed;
    a register set containing configuration data enabling presentation of the image data; and
    a bus interface enabling communication over a bus between the memory core of the display controller and the microprocessor, the bus interface being configured to communicate with a set of command signals, the set of command signals defines both whether read operations and write operations are to occur over a bus cycle and whether valid data exists for each bit of the read operation and the write operation, wherein each command signal in the set of command signals defines enable data for one of the read operations and write operations.

2. The display controller of claim 1, wherein the command signals are configured to specify a location of the valid data on the bus for one of an 8-bit read operation, a 16-bit read operation and a 32 bit read operation.

3. The display controller of claim 1, wherein the set of command signals is defined by a subset of write enable signals and a subset of read enable signals.

4. The display controller of claim 3, wherein the subset of write enable signals is defined by four write enable bits.

5. The display controller of claim 3, wherein the subset of read enable signals is defined by four read enable bits.

6. The display controller of claim 4, wherein the four write enable bits are WE0#, WE1#, WE2#, and WE3#.

7. The display controller of claim 5, wherein the four read enable bits are RD0#, RD1#, RD2#, and RD3#.

8. The display controller of claim 3, wherein when each write enable signal is a logical high value indicates the read operation.

9. The display controller of claim 3, wherein when each read enable signal is a logical high value indicates the write operation.

10. A system, comprising:

a central processing unit (CPU);

a data bus; and a display controller in communication with the CPU through the data bus, the display controller including a bus interface to enable communication over the data bus with the CPU, the bus interface being configured to communicate with a set of command signals, the set of command signals defines both whether read operations and write operations are to occur over a bus cycle and whether valid data exists for each bit of the read operation and the write operation, wherein each command signal in the set of command signals defines enable data for one of the read operations and write operations.

11. The system of claim 10, wherein the command signals are configured to specify a location of the valid data on the bus for one of an 8-bit read operation, a 16-bit read operation and a 32 bit read operation.

12. The system of claim 10, wherein the set of command signals is defined by a subset of write enable signals and a subset of read enable signals.

13. The system of claim 12, wherein the subset of write enable signals is defined by four write enable bits.

14. The system of claim 12, wherein the subset of read enable signals is defined by four read enable bits.

15. The system of claim 13, wherein the four write enable bits are WE0#, WE1#, WE2#, and WE3#.

16. The system of claim 14, wherein the four read enable bits are RD0#, RD1#, RD2#, and RD3#.

17. The system of claim 10, wherein the display controller includes 21 bits of address space.

18. A method for performing a read operation or a write operation between a microprocessor and a display controller, the method comprising:

defining a set of command signals configured to indicate whether the read operation or the write operation is to be performed over a bus cycle and whether valid data exists for each bit of the read operation and the write operation, wherein each command signal in the set of command signals defines enable data for one of the read operation and the write operation;

selecting a display controller in communication with a system bus;

asserting the set of command signals;

sampling the asserted set of command signals to determine a type of operation and a bit-location of valid data on the system bus;

selecting the bit location of the system bus having the valid data; and performing the read operation or the write operation.

19. The method of claim 18, wherein the command signals are configured to specify a location of the valid data on the bus for one of an 8-bit read operation, a 16-bit read operation and a 32 bit read operation.

20. The method of claim 18, further including:

defining set up and hold times for accommodating a propagation delay.

21. The method of claim 18, wherein the method operation of sampling the asserted set of command signals to determine a type of operation and a bit-location of valid data on the system bus, further includes:

extending the bus cycle until valid data is available.

22. The method of claim 21, wherein the method operation of extending the bus cycle until valid data is available, further includes:

driving a WAIT# signal low.

23. A method for adapting a display controller to communicate with a variety of microprocessors, the method comprising:

receiving a chip select signal;

acknowledging the chip select signal;

receiving a set of command signals configured to indicate whether the read operation or the write operation is to be performed over a bus cycle and whether valid data exists for each bit of the read operation and the write operation, wherein each command signal in the set of command signals defines enable data for one of the read operations and write operations; and performing the read or the write operation for the valid data as defined by the command signals.

24. The method of claim 23, further including:

defining set up and hold times for accommodating a propagation delay.

25. The method of claim 23, wherein the set of command signals is defined by a subset of four write enable signals and a subset of four read enable signals.

26. The method of claim 25, wherein the four write enable signals are defined by write enable bits WE0#, WE1#, WE2#, and WE3#.

27. The method of claim 25, wherein the four read enable signals are defined by read enable bits RD0#, RD1#, RD2#, and RD3#.

28. The method of claim 23, wherein the method operation of performing the read or the write operation for the valid data as defined by the command signals further includes:

extending the bus cycle until valid data is available.

29. The method of claim 28, wherein the bus cycle is extended by driving a WAIT# signal low.

* * * * *